United States Patent [19]

Yabuuchi et al.

[11] Patent Number: 4,992,955
[45] Date of Patent: Feb. 12, 1991

[54] APPARATUS FOR REPRESENTING CONTINUOUS TONE AND HIGH CONTRAST IMAGES ON A BILEVEL DISPLAY

[75] Inventors: Shigeru Yabuuchi, Tokyo; Satoshi Yoshizawa, Kawasaki; Masakazu Ejiri, Tokorozawa; Seiji Kashioka, Hachioji; Yasuo Kurosu, Yokohama; Hiroaki Aotsu, Yokohama, all of Japan

[73] Assignee: Hitzchi, Ltd., Tokyo, Japan

[21] Appl. No.: 261,330

[22] Filed: Oct. 24, 1988

[30] Foreign Application Priority Data

Oct. 28, 1987 [JP] Japan .................. 62-270199

[51] Int. Cl.$^5$ .............. G06F 15/66; G06F 3/14; H04N 1/40
[52] U.S. Cl. .................. 364/518; 358/465; 358/456; 382/50
[58] Field of Search ........... 364/521, 518; 382/41, 382/50, 53; 358/280, 282, 284, 283

[56] References Cited

U.S. PATENT DOCUMENTS

| | | | |
|---|---|---|---|
| 4,246,614 | 1/1981 | Knox | 358/283 |
| 4,554,593 | 11/1985 | Fox et al. | 358/282 |
| 4,577,235 | 3/1986 | Kannapell et al. | 358/283 |
| 4,686,579 | 8/1987 | Sakamoto | 358/282 |
| 4,737,859 | 4/1988 | Van Daele | 358/296 |
| 4,783,832 | 11/1988 | Kaneko | 382/41 |
| 4,797,943 | 1/1989 | Murayama et al. | 382/54 |

FOREIGN PATENT DOCUMENTS 144141 10/1979 Japan .
281370 of 1986 Japan .

OTHER PUBLICATIONS

Jarvis et al., "A Survey of Techniques for the Display of Continuous Tone Pictures on Bilevel Displays", Computer Graphics and Image Processing 5, 1976, pp. 13-40.

Primary Examiner—Gary V. Harkcom
Assistant Examiner—Raymond J. Bayerl
Attorney, Agent, or Firm—Antonelli, Terry, Stout & Kraus

[57] ABSTRACT

A half tone display apparatus using a display apparatus of bilevel representation in white and black is provided. The apparatus includes a unit supplied with a multilevel image such as a color image, a device for detecting edges in characters, patterns and photographic images, a unit for deriving a level difference between pixels adjacent to the edge, and a control unit for forcibly displaying a pixel of the edge portion as a white or black pixel for emphasis provided that the level difference is not larger than a predetermined threshold and for applying dither conversion to other pixels.

9 Claims, 11 Drawing Sheets

FIG. 2 PRIOR ART
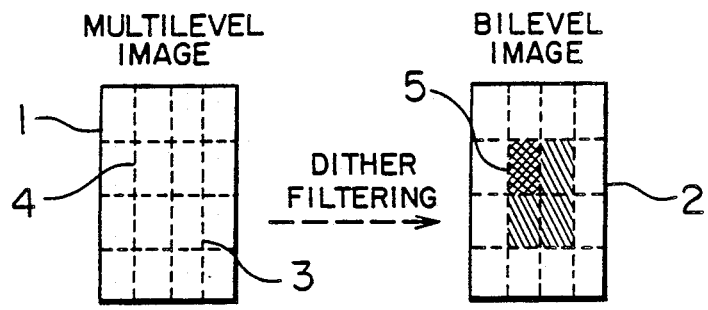
FIG. 3 PRIOR ART
```
STEP 1:  i = x MODULO N,  j = y MODULO N
STEP 2:  IF  I(x,y) > D(i,j) THEN B(x,y) = O(WHITE)
                             ELSE B(x,y) = L(BLACK)
```
FIG. 4 PRIOR ART
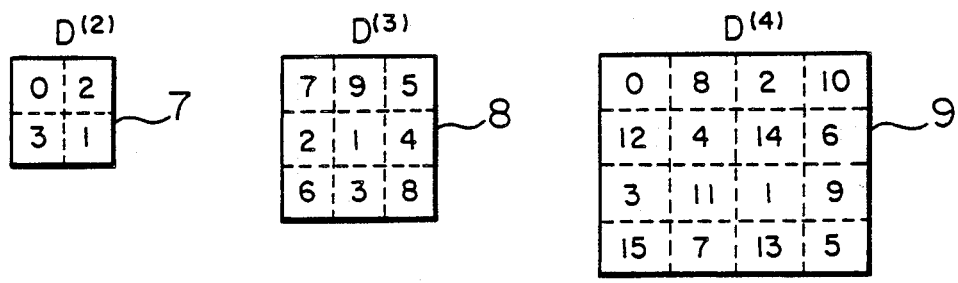

APPARATUS FOR REPRESENTING CONTINUOUS TONE AND HIGH CONTRAST IMAGES ON A BILEVEL DISPLAY

BACKGROUND OF THE INVENTION

The present invention relates to an apparatus for displaying half tone images on a bilevel display.

There are two conventional methods for representing half tone images with bilevel values:

(1) the dither method and (2) the density pattern method. In the dither method, one display pixel is associated with one pixel of a continuous tone (multi-level) image which is an original image, and continuous tone values are quantized by using threshold values defined beforehand with respect to respective pixel positions, each pixel thus being determined to be either black or white. In the density pattern method, one pixel of an original image is associated with an nxn dot matrix imitatively representing the continuous tone value of that pixel to display bilevel images. Descriptions in COMPUTER GRAPHICS AND IMAGE PROCESSING 5, 1976, pp. 13 to 40 and JP-A-54-144141 relate to the former cited method. On the other hand, JP-A-61-281370 and JP-A-56-66970 relate to the latter cited method.

The present invention relates to the former method. The conventional techniques will now be further described by referring to FIGS. 2, 3 and 4. Assuming now that a multi-level image 1 is represented by 5 levels, a 2×2 matrix (dither matrix) 7 representing 5 grades as shown in FIG. 4, for example, is produced. A 2×2 pixel region 3 of the multi-level image 1 is associated with the dither matrix as shown in FIG. 2. Level values of pixels forming respective elements of the region 3 are compared with quantization thresholds forming corresponding elements of the dither matrix. When the level value of a pixel of the original image is larger than the threshold value, a pixel of a displayed bilevel image 2 (such as a pixel 5 corresponding to a pixel 4 of the original image 1) is displayed as a white pixel. Otherwise, a black pixel is displayed. This processing is generalized in FIG. 3.

In FIG. 3, n denotes size of the dither matrix, x a coordinate value of the original image in the x direction, y a coordinate value of the original image in the y direction, i a row number of the dither matrix, j a column number of the dither matrix, I(x, y) a tone value of a pixel (x, y) of the original image, D(i, j) a value of an element (i, j) of the nxn dither matrix, and B(x, y) a displayed value of a pixel (x, y) of the bilevel image. Further, dither matrices 8 and 9 of FIG. 4 exemplify threshold setting proposed in the prior art for n=3 and n=4, respectively. Further, it is assumed that luminance becomes higher as the tone value becomes larger.

It is assumed that in a work station a multi-level image, particularly a document generated by software, which has been developed for a multi-level display such as a color display or a half tone display, is displayed on a bilevel display by using the prior art. If the contrast with respect to the background color is small in this case, the image becomes extremely hard to see. Further, a drop in display resolution caused by use of the dither method prevents making the contrast small as compared with color. The prior art thus has problems associated therewith.

The establishment of the dither matrix of the prior art has a problem in that flicker is caused when a display of an interlace scheme is used. Further, when comments are added to a bilevel image, the display of the bilevel image to be operated with half tone and the emphasis thereof has not been considered.

In addition, a problem as shown in FIG. 5 is caused as described below when a half tone display device using the conventional dither method is applied to a multiwindow system. It is assumed that a window 201 on a display screen 200 is moved to the position of a window 202, a drawing area 204 is newly added, and half tone display using the dither method is applied thereto. Originally, the half tone should be displayed on the drawing area 204 and should have the same phase as that of a drawing area 203. Since the method shown in FIG. 3 is used in the prior art, however, the phase of dither is different from that of the drawing area 203 as illustrated in a drawing area 206 within a display screen 205, resulting in a problem that the user feels uncomfortable.

SUMMARY OF THE INVENTION

An object of the present invention is to provide an apparatus which is free from the above described problems and which displays a document comprising a half tone display on a bilevel display with high quality.

The above described object is achieved by a half tone display apparatus comprising means for detecting an edge 13 of characters, patterns and photographic images included in a document having a multi-level image 10 as shown in FIG. 6, means for deriving a level difference between pixels 14 adjacent to the edge, and control means for forcibly displaying a pixel of the edge as a black or white pixel to emphasize it provided that the above described level difference is not larger than a predetermined threshold and for applying dither conversion to other pixels, a dither pattern being dynamically rearranged on the basis of coordinates of a reference point of a window (i.e., a frame for displaying a part of a document or the like on the screen) at a position whereat the window is first opened and coordinates of the reference point of the window after the window has been moved.

Owing to such configuration, a half tone display using the dither method according to the present invention provides high quality images which are easy to see because contours are emphasized in the half tone display when contrast with respect to background color is small.

BRIEF DESCRIPTION OF THE DRAWINGS

FIG. 2 schematically shows the dither method of the prior art.

FIG. 3 shows contents of processing in the dither method of the prior art.

FIG. 4 shows dither matrices of the prior art.

DESCRIPTION OF THE PREFERRED EMBODIMENTS

The present invention will now be described in detail by referring to drawings.

Figure 7:
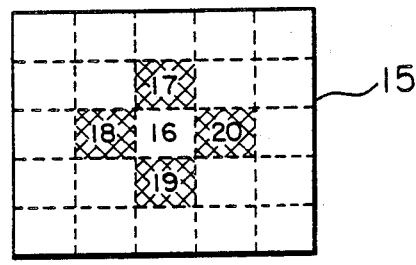
Figure 8:
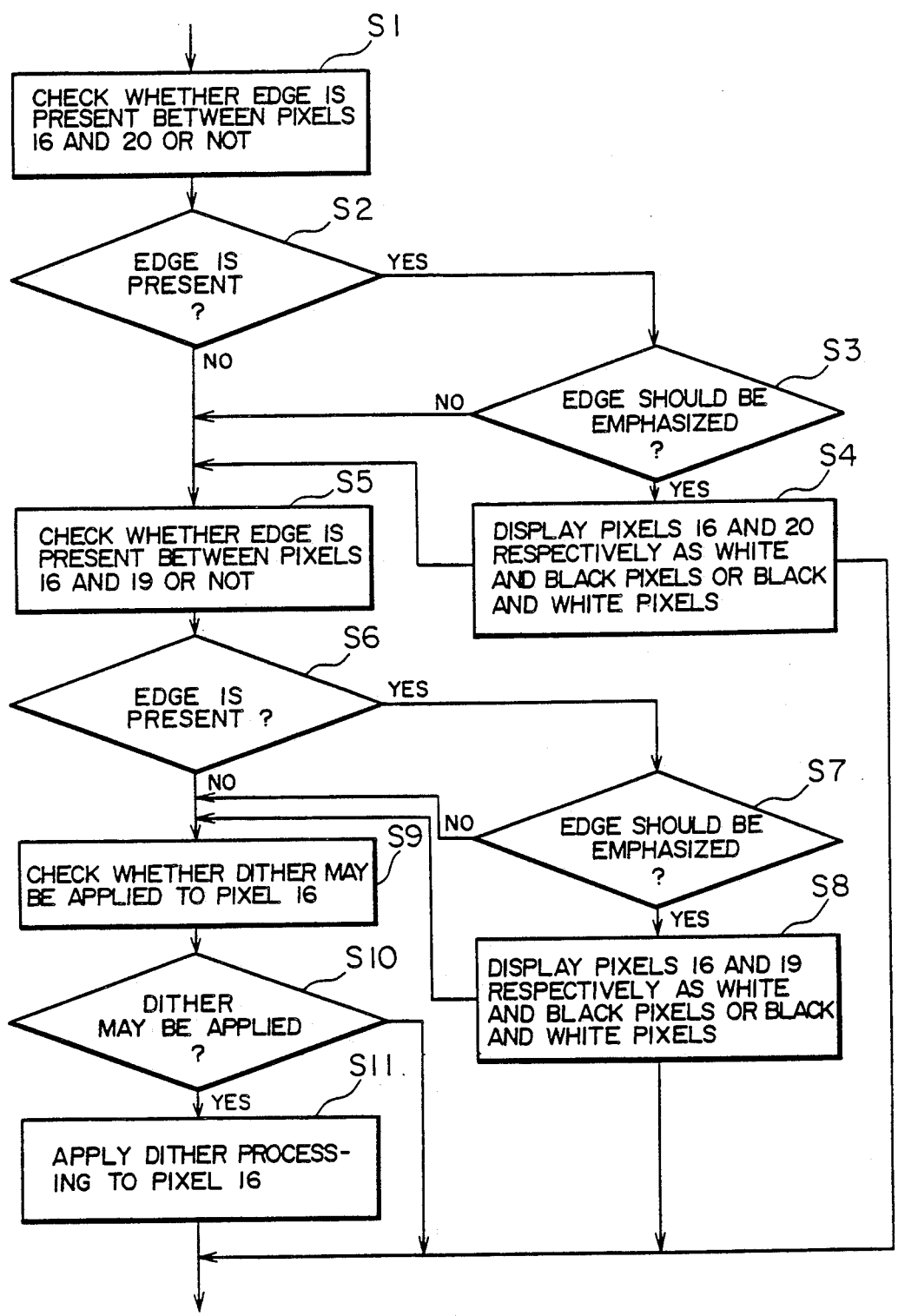
FIG. 8 is a schematic flowchart of the present invention.
Figure 9:
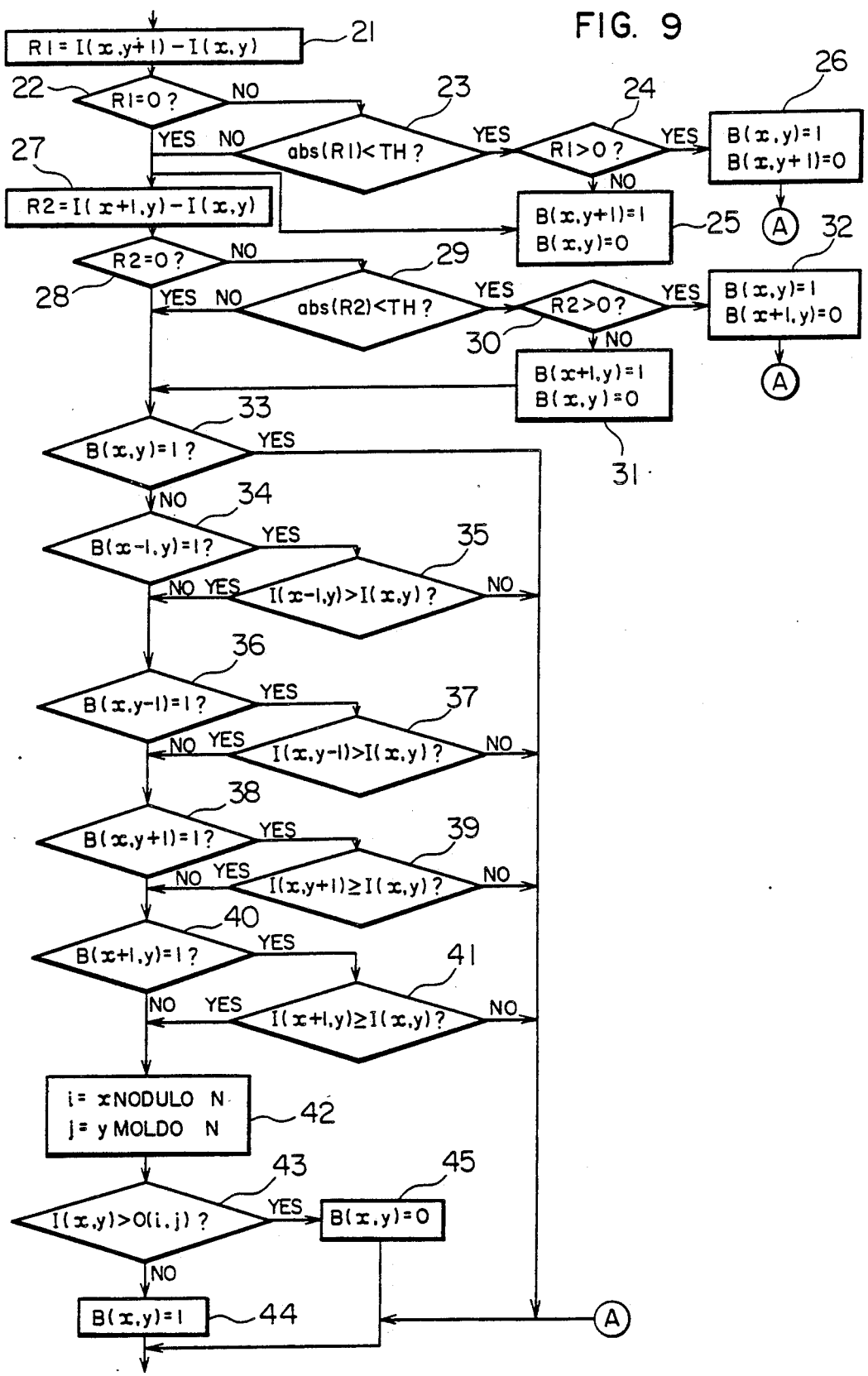
FIG. 9 is a detailed processing flowchart of the present invention.
Figure 10:
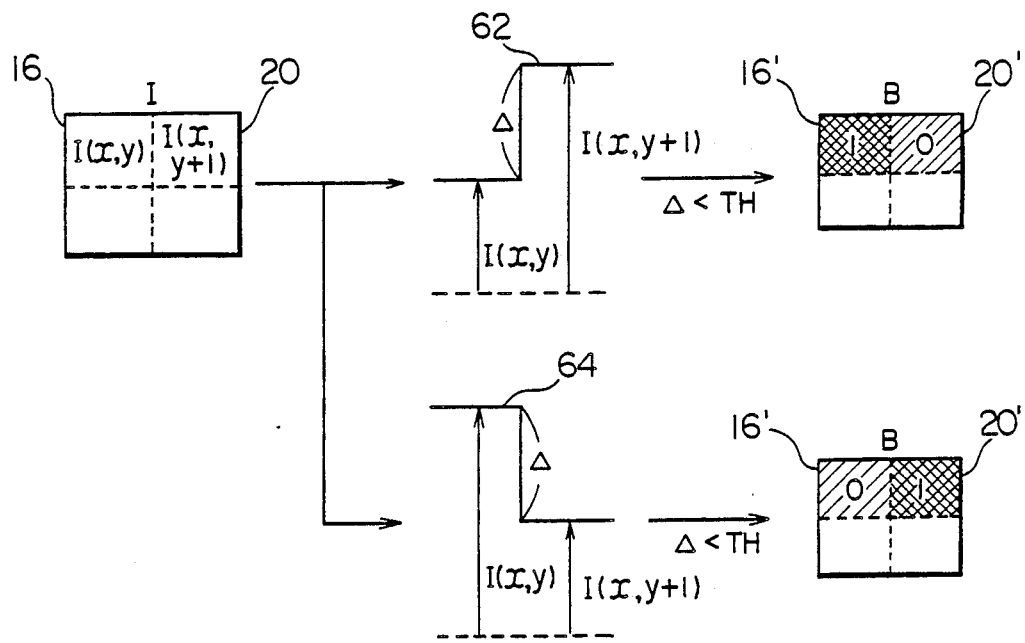
FIGS. 10 and 11 are subsidiary diagrams for explaining FIG. 9.
Figure 11:
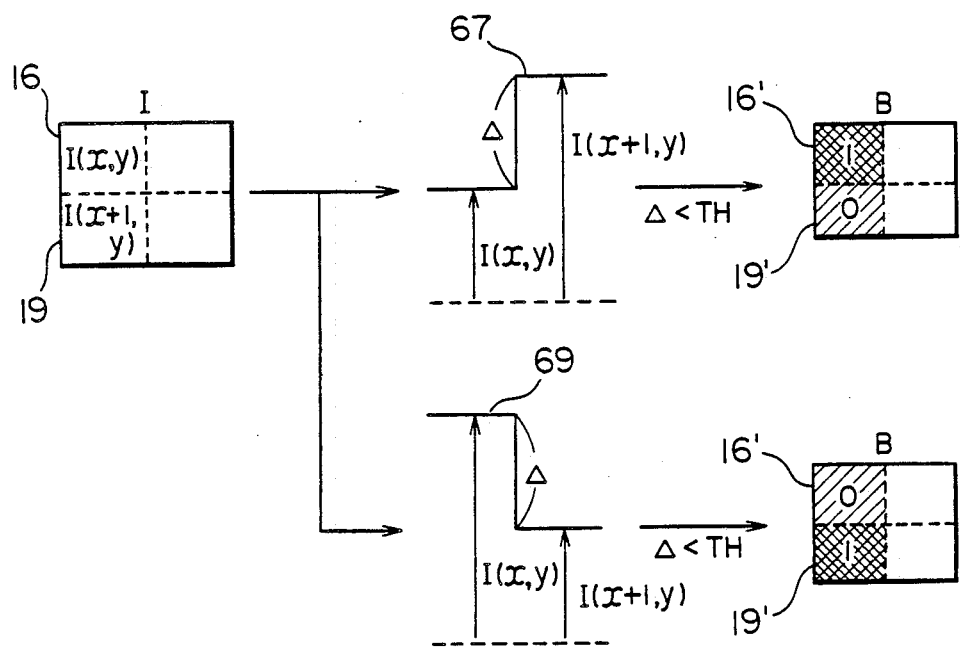

First of all, the principle of a half tone display having an edge emphasis function which is a feature of the present invention will be described by referring to FIGS. 7 to 11. FIG. 7 shows a range of pixels operated to perform edge detection and emphasis control. FIG. 8 schematically shows a processing procedure of half tone display according to the present invention. FIG. 9 shows details of the processing procedure of half tone display according to the present invention. FIGS. 10 and 11 show an edge emphasis method.

In an embodiment of edge emphasis according to the present invention, a noted pixel 16 shown in FIG. 7 is compared with four adjacent pixels 17, 18, 19 and 20 in order to define the display value of the pixel 16 on the bilevel image. Assuming now that coordinate values of pixels 16, 17, 18, 19 and 20 shown in FIG. 7 are respectively (x, y), (x−1, y), (x, y−1), (x+1, y) and (x, y+1), the processing operation for half tone display according to the present invention can be represented by flowcharts shown in FIGS. 8 and 9.

At steps S1 to S10 of FIG. 8, edge emphasis processing as shown in FIGS. 10 and 11 is performed. At step S11, dither processing is performed for pixels to which edge emphasis is not applied.

The steps S1 to S4 of FIG. 8 are provided to compare the level of the pixel 16 with that of the pixel 20, which is adjacent to the pixel 16 in the pixel direction as shown in FIG. 10, and to define whether edge emphasis should be performed or not. If the level of the pixel 16 has relationship such as relationship 62 of FIG. 10 with respect to the level of the pixel 20 and the level difference is not larger than a predetermined threshold (step S3), the display value of a pixel 16′ of a bilevel image B (corresponding to the pixel 16 of the multi-level image) is set at "1" (black), and the display value of a pixel 20′ is set at "0" (white). If, on the other hand, relationship 64 of FIG. 10 holds true and the level difference is not larger than the predetermined threshold, the display value of the pixel 16′ is set at "0" (white) and the display value of the pixel 20′ is set at "1" (black), and thereby edge detection and emphasis are performed (step S4).

If the relationship shown in FIG. 10 does not hold true between the pixel 16 and the pixel 20, the relationship between the pixel 16 and the pixel 19 is checked as shown in FIG. 11, and bilevel representation similar to that of FIG. 10 is performed. Processing of FIG. 11 is performed at steps S5 to S8 as shown in FIG. 8.

If the display value of the pixel 16′ cannot be defined on the basis of the relations between the pixel 16 and the pixel 20 and between the pixel 16 and the pixel 19, the relationship between the pixels 17, 18, 19 and 20 and the pixel 16 is checked to define the display value of the pixel 16. This processing is performed at steps S9 and S10 shown in FIG. 9. That is to say, if pixel 17′ or 18′ is black, and the pixel 16 of the multi-level image has a higher level as compared with the pixel 17 or 18, the display value defined by processing of an immediately preceding pixel (pixel 18 in the example of FIG. 7) is employed as the display value of the pixel 16′. Similar processing is applied to the relation between the pixel 16 and the pixel 19 and the relation between the pixel 16 and the pixel 20. The final display value of the pixel 16 is thus defined.

If the display value of the pixel 16′ is not defined by the above described processing, i.e., if an edge is not detected or edge emphasis is not necessary, dithering shown in FIG. 3 is performed at step S11 of FIG. 8 and the display value of the pixel 16′ is defined.

FIG. 9 shows contents of FIG. 8 in detail.

The steps S1 and S2 of FIG. 8 correspond to steps 21 and 22 of FIG. 9. The step S3 of FIG. 8 corresponds to step 23 of FIG. 9. The step S4 of FIG. 8 corresponds to steps 24 to 26 of FIG. 9. The steps S5 and S6 of FIG. 8 correspond to steps 27 and 28 of FIG. 9. The step S7 of FIG. 8 corresponds to step 29 of FIG. 9. The step S8 of FIG. 8 corresponds to steps 30 to 32 of FIG. 9. The steps S9 and S10 of FIG. 8 correspond to steps 34 to 41 of FIG. 9. The step S11 of FIG. 8 corresponds to steps 42 to 45 of FIG. 9.

The processing of FIG. 9 is performed in the direction of raster scan and so configured to achieve high speed processing.

Figure 1:
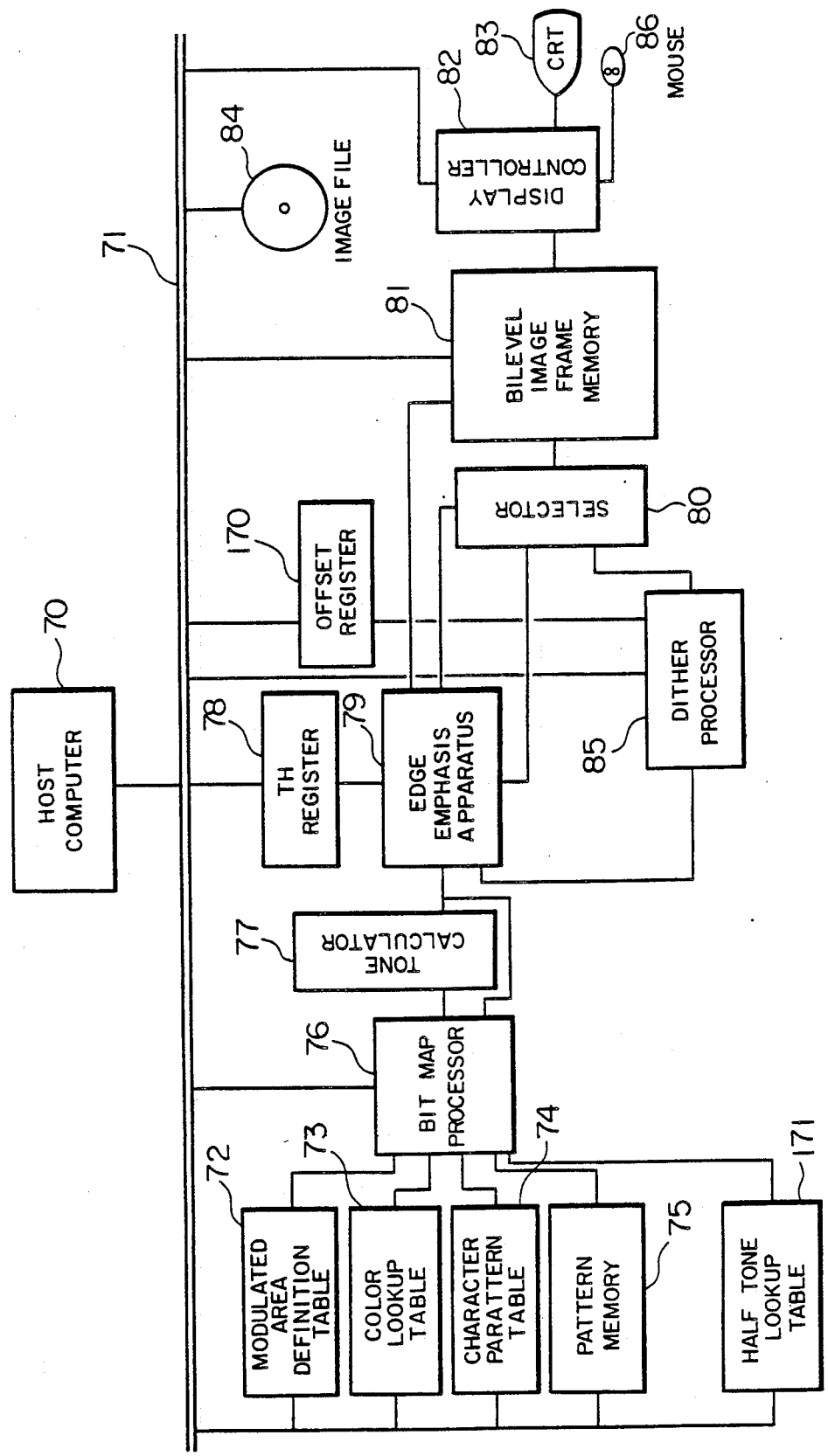
FIG. 1 is a schematic diagram of an embodiment of an apparatus according to the present invention.
Figure 12:
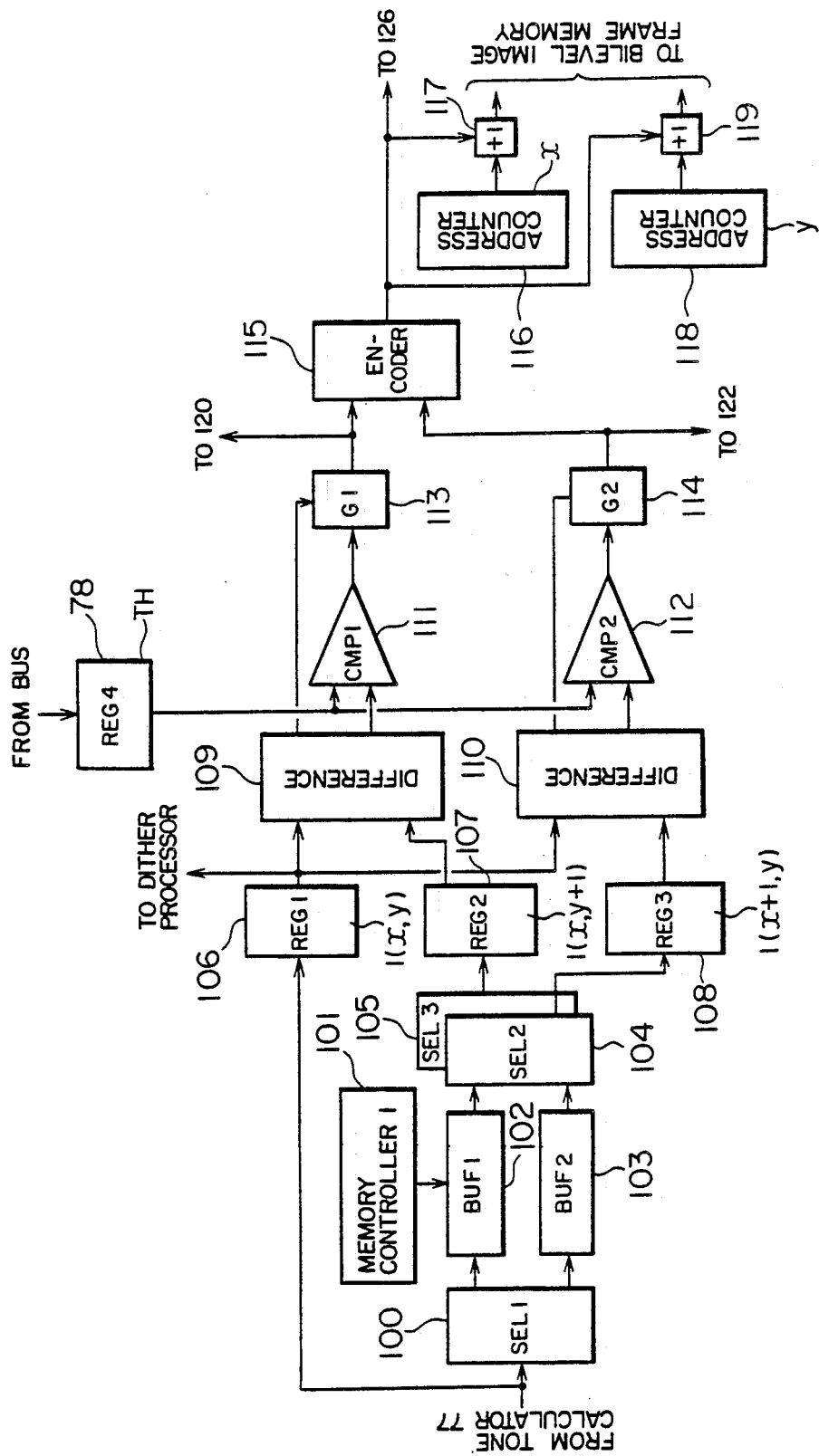
FIGS. 12 and 13 are detailed circuit diagrams of an embodiment of the present invention.
Figure 13:
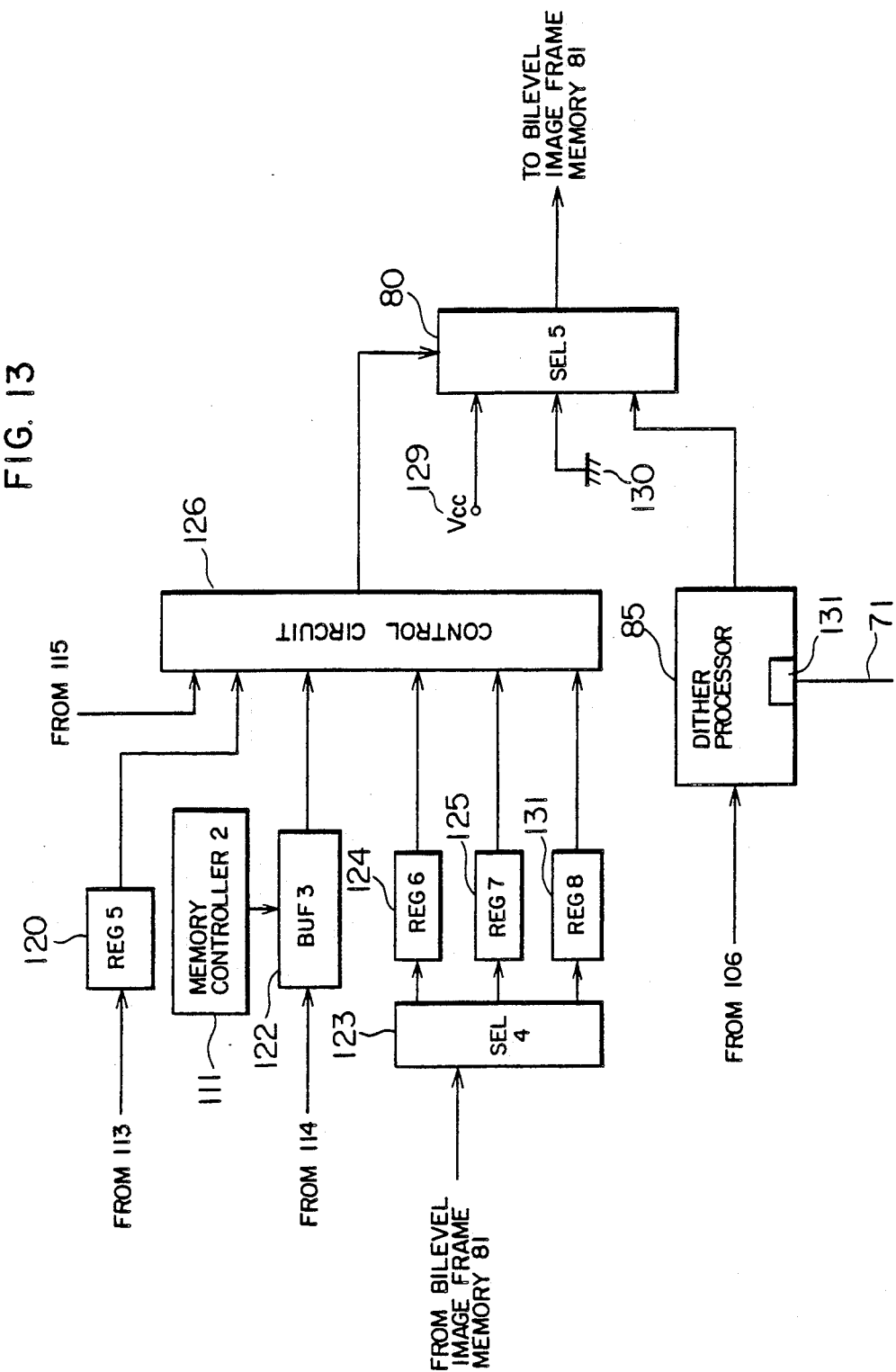

The configuration and operation of an embodiment of an apparatus for performing the processing of FIG. 9 will now be described. FIG. 1 schematically shows the apparatus. FIGS. 12 and 13 show an embodiment of an edge emphasis apparatus.

A host computer 70 shown in FIG. 1 is a processor for performing document processing and the like and is connected to a display apparatus of the present invention, an image file 84 storing images and the like via a bus 71. In FIG. 1, a modulated area definition table is a table for specifying an area of a bilevel image whereto half tone display of the present invention should be applied. A color look-up table 73 is a table for specifying color data (R, G and B) of color images generated by the host computer 70. A character pattern table 74 is a memory for storing patterns of character fonts. A pattern memory 75 is a memory for storing icons, texture patterns and the like. Further, a half tone look-up table 171 is a table for specifying the tone of images when CRT 83 is monochromatic. Upon demand, the host computer 70 sets data on the tables via the bus 71. While referring to these data in accordance with commands supplied from the host computer 70, a bit map processor 76 generates multi-level image data comprising characters, patterns and photographic images. A tone calculator 77 is provided to derive tone from the color value when color images are generated by the bit map processor 76 as described later in detail. A TH register 78 is a register for storing a threshold TH used to judge edge emphasis. An edge emphasis apparatus 79 and a selector 80 are hardware, for carrying out the steps 21 to 41 of FIG. 9 and dither processor 85 is the hardware for carrying out the processing of the steps 42 to 45 shown in FIG. 9. Images represented by bilevels are stored into a bilevel image frame memory 81 by the hardware, converted into video signals by a display controller 82, and displayed on a bilevel display 83. Further, when bilevel images stored in the image file 84 and the bilevel image frame memory 81 are to be displayed with half tone, the host computer first sets the area into the modulated area definition table 72, and sets level values of the white level and the black level of the bilevel images into a color table 73. The host computer 70 then reads out bilevel images from the image file 84 or the bilevel image frame memory 81 and sends the bilevel images to the edge emphasis apparatus 79 and the dither processor 85 via the bit map processor 76 to display bilevel images with half tone.

An embodiment of the circuit group comprising circuits 78 to 80 of FIG. 1 will now be described in detail by referring to FIGS. 12 and 13. FIGS. 12 and 13 show an apparatus for carrying out the half tone display processing of the present invention shown in FIG. 9. It is assumed in the present embodiment that the bit map processor generates multi-level images along scanning lines of the display. In accordance with the present invention, buffering of level values of pixels becomes necessary in order to compare a pixel with adjacent pixels as described with reference to FIG. 9. (The level values to be buffered correspond to values derived by the tone calculator 77 when a color CRT is used. On the other hand, the level values to be buffered correspond to values of the half tone look-up table 171 when the CRT is monochromatic.) Buffer memories BUF1 102 and BUF2 103 shown in FIG. 12 are used for this purpose. By a selector SEL1 100, pixel data of odd-numbered rasters are assigned to be stored into BUF1 and pixel data of even-numbered rasters are assigned to be stored into BUF2. Numerals 106, 107 and 108 denote registers REG1, REG2 and REG3, respectively. Level values $I(x, y)$, $I(x, y+1)$ and $I(x+1, y)$ of pixels of a multi-level image are stored into the REG1 106, REG2 107 and REG3 108, respectively. The above described data read out from the BUF1 or BUF2 are stored into the REG2 and REG3 via selectors SEL3 and SEL2.

Calculation at the steps 21 and 27 of FIG. 9 is performed by a first difference unit 109 and a second difference unit 110. The steps 22 to 24 and the steps 28 to 30 of FIG. 9 are performed by circuits 111 to 114 of FIG. 12. To be concrete, outputs of the first and second difference units are compared with the threshold TH stored in the register REG4 78 respectively in comparators CMP1 111 and CMP2 112. Results of conditional judgment are coded in logic gates G1 113 and G2 114 and then outputted. Signals respectively supplied from the first and second difference units to G1 and G2 respectively represent signs of $R_1$ and $R_2$ shown in FIG. 9 and control the results of comparison to perform absolute value processing of the steps 23 and 29 shown in FIG. 9.

On the other hand, the conditional judgment of steps 33 to 41 of FIG. 9 is performed in a control circuit 126 as a logical operation by using values of $B(x-1, y)$, $B(x, y-1)$ and $B(x+1, y)$ read out from the bilevel image framing memory 81 via a selector SEL4 123 and respectively stored into registers REG6 124, REG7 125 and REG8 131, a value read out from a buffer memory BUF3 122 (which is the result of comparison of $I(x+1, y)$ with $I(x, y)$ derived one raster in advance), and the result of $I(x, y-1)$ and $I(x, y)$ derived by the processing of a single pixel procedure and stored into a register REG5 120.

Respective conditional judgments of FIG. 9 are performed by the circuits heretofore described. Results of the steps 22 to 24 and steps 28 to 30 are coded in an encoder 115 to control write addresses for the bilevel image frame memory 81 used at the steps 25, 26, 31, 32, 44 and 45. On the basis of results of conditional judgment performed at the steps 33 to 36 in addition to the above described conditional judgment, the control circuit selects any one of the value "0" (white), the value "1" (black) and the output of the dither processor 85 by using the selector SEL5 80 and writes it into the frame memory 81.

The edge emphasis portion forming the principal portion of the present invention which generates half tone images with edge emphasis applied is described. An embodiment of the tone calculator 77 will now be described by referring to FIGS. 14 and 15.

Figure 14:
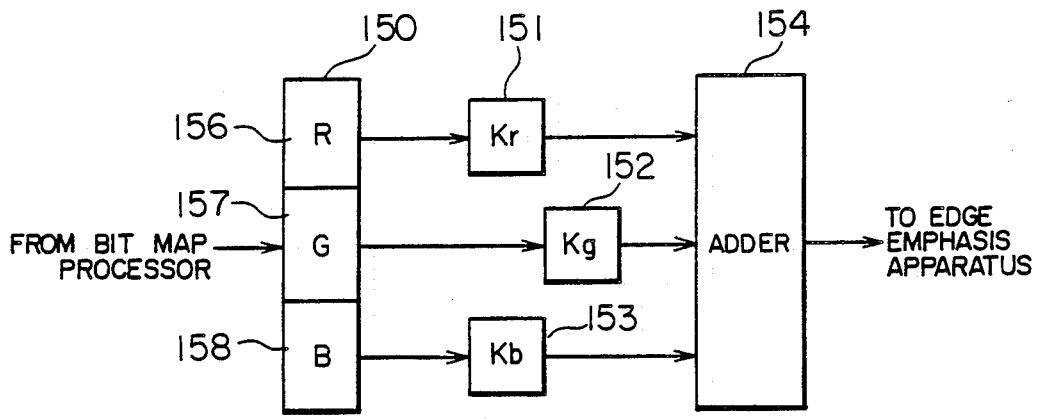
FIGS. 14 and 15 show an embodiment of a tone calculator.
Figure 15:
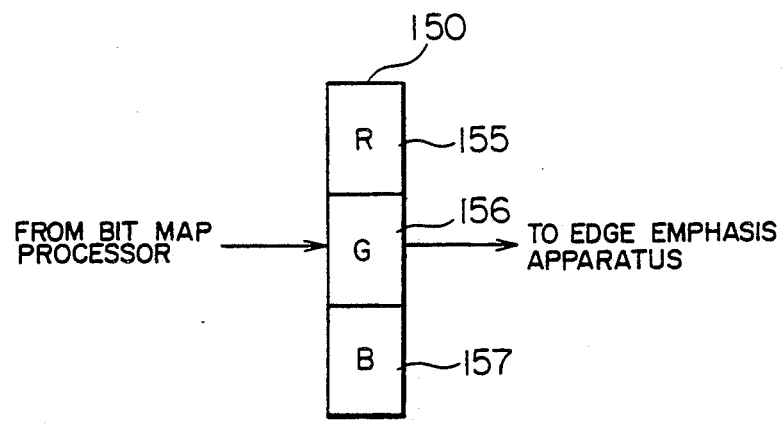

Two schemes are conceivable for the output of the bit map processor 76. One of them is a look-up table scheme, while the other is a scheme entailing the direct color of codes R, G and B. Since the output is converted into color codes at the final stage in the former scheme as well, level values are calculated from color codes as denoted by 150 of FIG. 14 in the present invention. A first embodiment is shown in FIG. 14. In FIG. 14, numerals 151, 152 and 153 denote multipliers. One of two inputs of each multiplier is fixed to a certain value (i.e., Kr for the multiplier 151, Kg for the multiplier 152 and Kb 1 for the multiplier 153).

Here, Kr, Kg and Kb are weighting coefficients relating to luminance of color components.

Luminance values are calculated for respective color components by using these multipliers. The total sum of the luminance values are derived in an adder 154 and outputted to the edge emphasis apparatus as the level value.

In a second embodiment, one color component is selected out of three color components as shown in FIG. 13, and its value is adopted as the level value.

Figure 16:
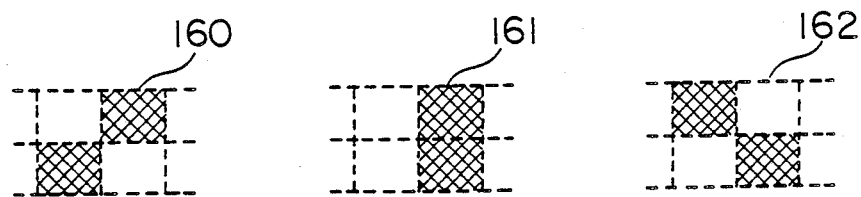
FIG. 16 shows a method of establishing the dither matrix for preventing flicker.

If a conventional dither matrix as shown in FIG. 4 is used in a bilevel display of an interlace scheme, only the raster portion of either of the interlace fields becomes white in some cases, thereby causing flicker. Since a bilevel display has a high contrast between the white display portion and the black display portion and rasters are displayed at repetition frequencies of typically 30 Hz in the interlace scheme, flicker is caused in the above described cases. In accordance with the present invention, a dither matrix wherein adjacent pixels in an odd-numbered raster and an even-numbered raster may be simultaneously displayed as white pixels as represented by 160 to 162 of FIG. 16 is established in an order to prevent flicker. When a beam is applied onto a certain pixel of a bilevel display, a fluorescent material emits light in Gauss distribution, and adjacent pixels also shine slightly. If adjacent pixels between interlaces are displayed as white pixels, therefore, pixels between interlaces interfere with each other, and hence it becomes possible to raise the repetition frequency of raster scans and eliminate flicker.

Further, observing that visual acuity of the eyes with respect to the slant direction is lowered as compared with the horizontal and vertical directions, a dither pattern is set so that pixels may shine successively in the slant direction as represented by 160 and 162 of FIG. 16 to enhance the space charge effect and to raise the image quality of the half tone display.

Figure 5:
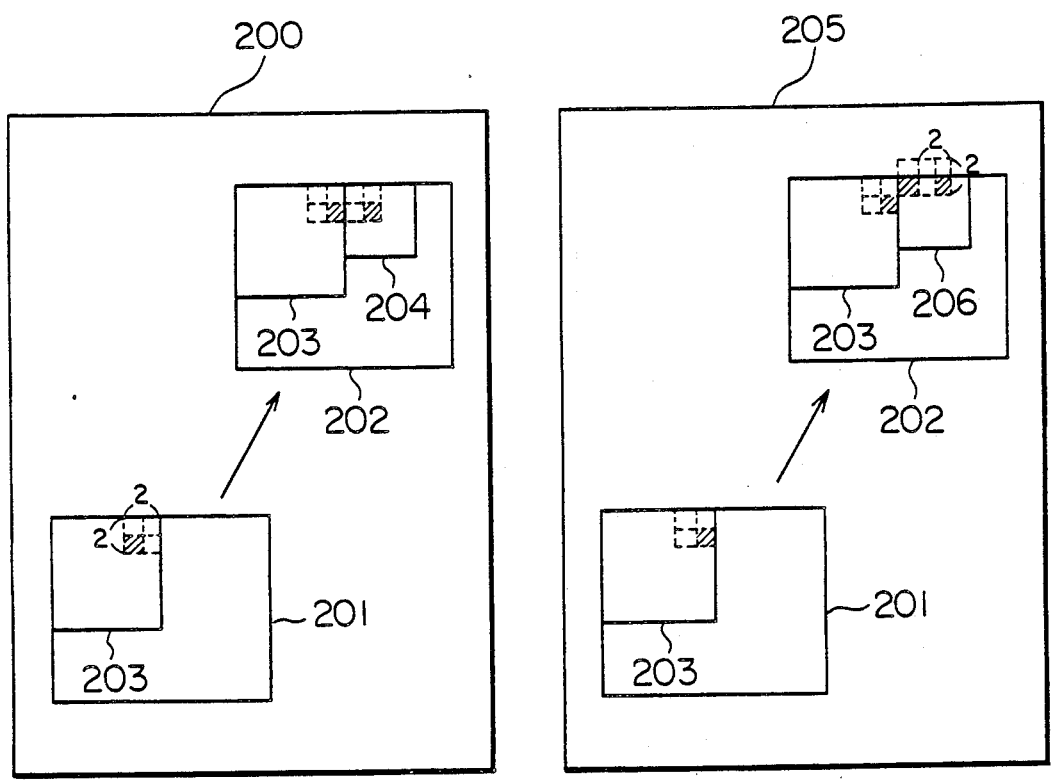
FIG. 5 shows problems of the prior art.
Figure 6:
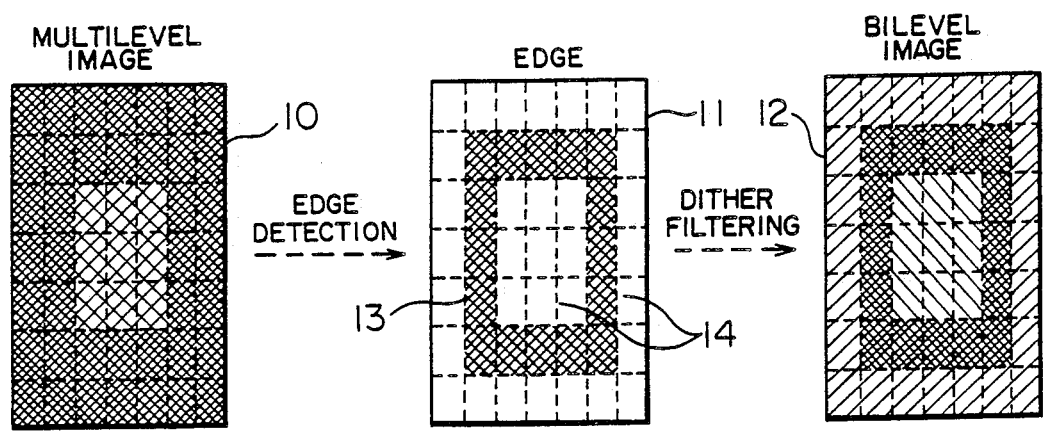
FIGS. 6 and 7 show operation principles of the present invention.
Figure 17:
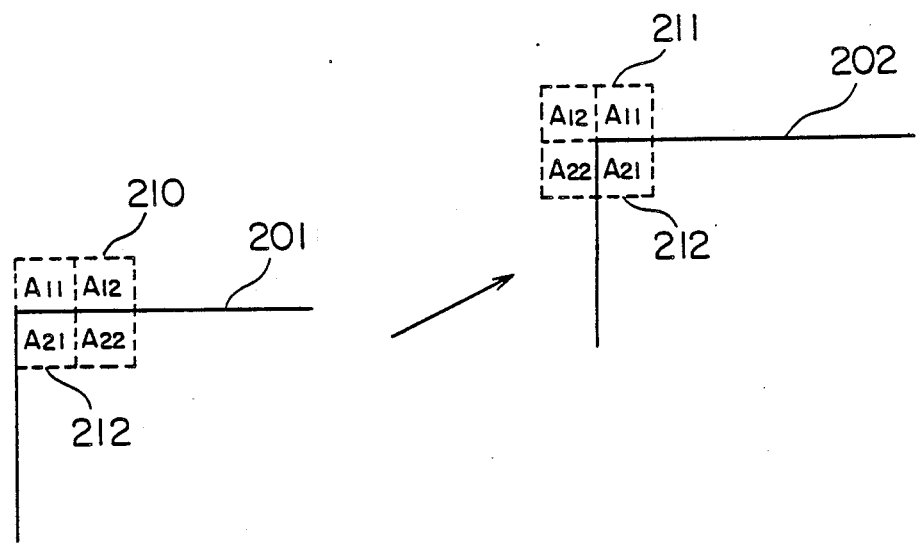
FIG. 17 shows a method of solving the problems of FIG. 5.

Two methods for solving the problem caused by the movement of a multiwindow in a multiwindow system will now be described. First of all, an embodiment in which the position of the origin of a window and the position of a displayed pattern are handled will now be described by referring to FIG. 17. Patterns 201 and 202 shown in FIG. 17 represent the above described windows 201 and 202 of FIG. 5. Assuming that the reference point (a pixel 212) of the window 201 opened first has coordinate values ($x_s$, $y_s$), the coordinate values of the reference point are converted into coordinate values ($i_s$, $j_s$) of the dither matrix. This conversion is performed as:

$$i_s = x_s \text{ modulo } n, \; j_s = y_s \text{ modulo } n. \quad (1)$$

Coordinate values ($x_d$, $y_d$) of the reference point of the window after movement are then derived, and coordinate values ($i_d$, $j_d$) in the dither matrix of the reference point after movement are calculated as $$i_d = x_d \text{ modulo } n, \; j_d = y_d \text{ modulo } n. \quad (2)$$

Before drawing within the window 202 is started, values of the dither matrix set for the window 201 are rearranged as:

$$A(a, b) \rightarrow B(c, d) \quad (3)$$

where A(a, b) represents the value of coordinates (a, b) in the dither matrix of the window 201, and B(c, d) represents the coordinate value in the dither matrix of the window 202. Placing $b = j_s$ and $d = j_d$ first, values of A(a, b) obtained by changing a as:

$$a = i_s, i_{s+1}, \dots, n, 0, 1, \dots, i_{s-1} \quad (4)$$

are stored into B(c, d) where c is changed as:

$$c = i_d, i_{d+1}, \dots, n, 0, 1, \dots, i_{d-1}. \quad (5)$$

When this operation has been finished, the operation represented by the expressions (4) and (5) is repeated while values of b and d are changed according to the following expressions to set new values of the dither matrix 1 after movement:

$$b = j_{s+1}, \dots, n, 0, 1, \dots, j_{s-1} \quad (6)$$

$$d = j_{d+1}, \dots, n, 0, 1, \dots, j_{d-1}. \quad (7)$$

An embodiment in which the size of the dither matrix is 2×2 is shown in FIG. 17.

The processing heretofore described is performed by the host computer 70 of FIG. 1 and the dither matrix is written into dither matrix storage means included in the dither processor 85 of FIG. 13 via the bus 71. Coordinates of the reference point of a window are read into the host computer via a mouse 86 shown in FIG. 1.

A second embodiment will now be described. In the second embodiment, only the origin of a window is specified by a coordinate system on a display screen, and a display object (such as a character and a pattern) existing within the window is represented by a coordinate system within the window, i.e., relative distance measured from the origin of the window. The reference origin of the dither matrix is set so as to agree with the origin of the window. This means that coordinate values (x, y) of a pixel for calculating the coordinate D(i, j) within the dither matrix of FIG. 3 referred to in the drawing are represented by the distance measured from the origin of the window.

In case respective coordinate systems are defined as described above and drawing is to be displayed on the display screen, half tone display processing is first performed in respective window coordinate systems, and the result is drawn from the origin of the window specified by the coordinate system on the display screen.

Figure 18:
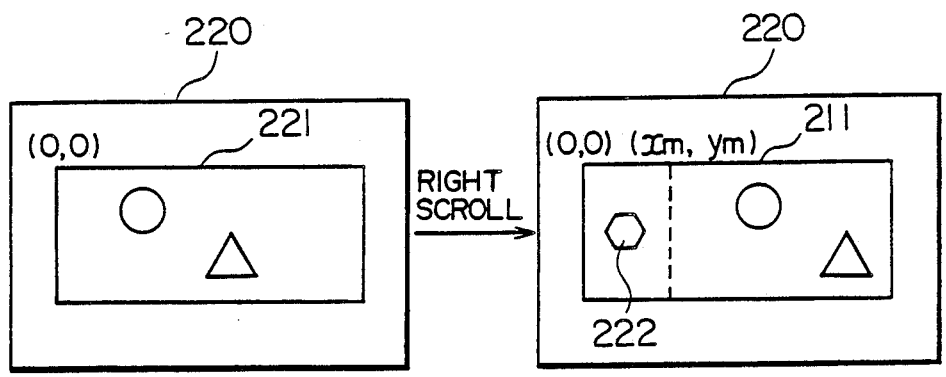
FIG. 18 is a subsidiary diagram for explaining the prevention of a phase shift of the dither pattern at the time of scrolling.

By using the method heretofore described, it becomes unnecessary to apply any operation to the dither matrix even if the window is moved on the screen. In this state, however, a phase shift of dither is caused when the display object is scrolled within the window as shown in FIG. 18. Therefore, an embodiment described below is added to prevent the phase shift of dither.

A concrete embodiment will now be described by referring to FIG. 18. In FIG. 18, numeral 220 denotes a display screen, and numeral 221 denotes a window frame. FIG. 18 shows an example of right scroll, in which the display contents within the window are moved beyond a coordinate point ($x_m$, $y_m$) within the window. This movement is achieved by performing a copy between bilevel image frame memories by using the selector SEL4 123, the register REG6 124 and the control circuit 126 shown in FIG. 13. The values of the start point ($x_m$, $y_m$) of movement are set into an offset register 170 shown in FIG. 1 and a new pattern 222 is drawn. The offset register 170 is provided for solving the phase shift caused when scrolling is performed. When values are set into the offset register 170, element numbers (i, j) of the dither matrix shown in FIG. 3 are derived as:

$$i = (x - x_m) \text{ modulo } n,$$

$$j = (y - y_m) \text{ modulo } n. \quad (8)$$

This operation is performed in the dither processor 85. In the expression (8), an element D(0, 0) of the dither matrix is referred to at a point represented as $x = x_m$ and $y = y_m$, i.e., at the start point of movement. It becomes equivalent to the element D(0, 0) of the dither matrix referred to at the origin of the window before movement. The phase shift of dither is thus eliminated.

Owing to the present invention, a multi-level or color image, e.g., a document, can be displayed on a bilevel display with high quality and quasi-half tone, and flickering is prevented even when the display is a bilevel display of an interlace scheme. Since a bilevel image can be displayed with, half tone, software for color display can be used as it is without alteration. Also images of high quality can be displayed on a display apparatus having low cost.

We claim:

1. A display apparatus for displaying a half tone image on a bilevel display, comprising:
   means for inputting multi-level image data, including characters, patterns or photographic images, to be displayed on a bilevel display;
   means for detecting edges in the characters, patterns, or photographic images;
   edge emphasis means for obtaining a level difference between a noted pixel bordering the edges and a pixel adjacent to the noted pixel and for forcibly defining a display value of the noted pixel as the value of a white or black pixel when the level difference is not larger than a predetermined threshold, whereby contours of the characters, patterns, or photographic images displayed on the bilevel display are emphasized;
   dither means for applying dither conversion to other pixels not bordering the edges and for determining display values of the other pixels; and portion pixel, provided that the level difference is not larger than a predetermined threshold, and for applying dither conversion to pixels other than edge portion pixels; wherein a dither conversion pattern is used so that adjacent pixels on an odd-numbered raster and an even-numbered raster may be simultaneously displayed as white pixels when a CRT of an interlace scheme is used.

2. A display apparatus according to claim 1, further comprising means for selecting any one of three primary colors representing a color that represents a pixel of an input image and for defining the selected primary color as a level of a pixel to be displayed with half tone.

3. A display apparatus according to claim 1, further comprising means for multiplying three primary colors representing a color that represents a pixel of an input image with respective weighting coefficients, for deriving a total sum of resultant products, and for defining the total sum as a level of a pixel to be displayed with half tone.

4. A display apparatus according to claim 1, further comprising means for memorizing coordinates of an origin of a first opened window, for rearranging set values of a dither matrix of the first opened window on the basis of coordinates of a window obtained after movement and the coordinates of the origin every time a window is opened so that a phase of a dither pattern within the first opened window may agree with a phase of a dither pattern within the window obtained after movement.

5. A display apparatus according to claim 1, wherein a dither conversion pattern is utilized to shine pixels in a slant direction.

6. A display apparatus according to claim 1, further comprising means for deriving element numbers of a dither matrix referred to at dither conversion on the basis of distance from origin coordinates of a window.

7. A display apparatus according to claim 1, further comprising means capable of changing element numbers of a dither matrix referred to at dither conversion on the basis of origin coordinates of a window.

8. A display apparatus according to claim 1, wherein a dither conversion pattern is used so that adjacent pixels on an odd-numbered raster and an even-numbered raster may be simultaneously displayed as white pixels when a CRT of an interlace scheme is used.

9. A display apparatus for displaying half tone images with multiple windows on a bilevel display, comprising:
means supplied with a multi-level image such as a color image for detecting edges in characters, patterns, photographic images and the like included in the multi-level image;
means for deriving a level difference between pixels adjacent to the edges; and
control means for forcibly displaying a pixel of an edge portion as a white or black pixel to emphasize the edge
means for displaying a half tone image on the bilevel display by using outputs of said edge emphasis means and said dither means.

* * * * *